Sept. 2, 1969      S. DIX      3,465,116

MULTIPLE HEATING UNIT

Filed Feb. 1, 1967      7 Sheets-Sheet 4

Fig. 4

INVENTOR:
Sydney Dix

ATTORNEYS

Sept. 2, 1969            S. DIX            3,465,116

MULTIPLE HEATING UNIT

Filed Feb. 1, 1967            7 Sheets-Sheet 6

INVENTOR:
Sydney Dix

ATTORNEYS

United States Patent Office

3,465,116
Patented Sept. 2, 1969

3,465,116
MULTIPLE HEATING UNIT
Sydney Dix, Huntington Beach, Calif., assignor, by mesne assignments, to GTI Corporation, Providence, R.I., a corporation of Rhode Island
Continuation-in-part of application Ser. No. 506,428, Oct. 20, 1965. This application Feb. 1, 1967, Ser. No. 613,163
Int. Cl. B23k 1/02, 1/04
U.S. Cl. 219—85                    19 Claims

ABSTRACT OF THE DISCLOSURE

Apparatus for performing a heating operation on a plurality of individual devices arranged in a predetermined spatial pattern on a workholder and using a unitary heating element having preformed heating areas arranged in the predetermined spatial pattern and with the heating element and workholder movable relative to each other so as to preheat the heating element before performing the heating operation on the individual devices by moving the workholder and unitary heating element adjacent to each other.

---

This is a continuation-in-part of application Ser. No. 506,428 filed Oct. 20, 1965, which in turn is a continuation-in-part of application Ser. No. 454,850 filed May 11, 1965 now abandoned.

In the manufacture of small devices such as diodes, transistors, etc., it is often necessary to produce a heating operation on these small devices. For example, the heating operation may be used for brazing, soldering, alloying, molding or for producing a seal between two portions of the small device. The present invention, therefor, may be used in the manufacture of small devices such as diodes, transistors, integrated circuits and other devices. In particular, the present invention is described with reference to the production of a sealing operation on a large number of individual devices such as diodes using a unitary heating element so as to produce the sealing operation on the large number of individual devices at the same time.

The present invention may be used to produce the final seal of the individual devices such as diodes or the present invention may be used to produce a seal between component parts prior to the final seal of the individual devices such as the diodes. For example, one particular use of the present invention, which is described in the instant application, is in the manufacture of a component portion of a diode consisting of a glass tubular member having one open end and one closed end and with an electrical lead sealed to and extending from one closed end of the glass tubular member. The glass tubular member including the electrical lead may then be used to receive additional components prior to a final seal which produces a finished diode.

The multiple heating unit of the present invention is extremely reliable and produces the sealing operation on a large number of individual devices with a relatively high yield. Also, the multiple heating unit of the present invention produces the sealing operation on the individual devices in a relatively short period of time compared to prior art sealing devices. The apparatus of the present invention is, therefore, capable of reliably sealing a large number of individual devices on a per hour basis. Also, the apparatus of the present invention can produce the sealing operation under controlled atmospheric conditions, since the individual components and the heating unit of the present invention may be contained within an atmospheric chamber. The sealing operation, therefore, can take place under controlled predetermined atmospheric conditions. For example, the sealing may take place in the presence of an inert gas so as to reduce the amount of contaminants present in the seal.

Prior art types of sealers either seal a small number of individual devices under controlled atmospheric conditions or individually seal a large number of individual devices under uncontrolled atmospheric conditions. Also, the prior art devices have limitations in the control of the temperature which produces the desired sealing operation and the prior art devices may be relatively slow in their heating operation so that their yield per hour is relatively low.

The various prior art types of sealing devices have been superseded by a sealing device as shown in copending application Ser. No. 506,428 filed Oct. 20, 1965, in the name of Sydney Dix. In the copending application a sealing apparatus is shown which includes a unitary heating element having a predetermined spatial pattern of preformed heating areas so as to produce a heating operation on a large number of individual devices at the same time. The present invention includes a unitary heating element and provides for the support of the individual devices on a workholder. In the present invention the unitary heating element and the workholder are movable relative to each other so that the unitary heating element may be preheated before the unitary heating element and the workholder are moved into a position adjacent to each other.

The provision of the unitary heating element and the workholder being movable relative to each other allows for the preheating of the unitary heating element so that any expansion of the unitary heating element takes place before the relative movement of the unitary heating element and the workholder to the position adjacent to each other. The preheating of the unitary heating element prevents a misalignment between the preformed heating areas contained in the unitary heating element and the individual devices.

One embodiment of the present invention relates to the manufacture of components for diodes wherein an electrical lead member is sealed within and extending from one end of a tubular glass member. The tubular glass members are supported on a first workholder and the electrical leads are supported to extend within one end of the tubular glass members by a second workholder. The second workholder is maintained in a fixed relationship to the first workholder. The unitary heating member has a plurality of preformed openings which surround the tubular glass members. When electrical energy is supplied to the unitary heating element, heating energy is produced within the preformed openings and the heating energy enters into the tubular glass members to soften the glass so that the glass becomes sealed to the electrical leads.

If the unitary heating element is maintained in a fixed position so that the preformed openings of the unitary heating element surround the tubular glass members prior to the supplying of electrical energy to the unitary heating element, the unitary heating element expands relative to the workholders when the electrical energy is supplied to the unitary heating element so that the preformed openings become misaligned with the tubular glass members, causing improper sealing and possible breakage of the tubular glass members. Although the workholders supporting the tubular glas members and the lead elements also expand due to the absorption of heat energy, the expansion of these workholders is significantly less than the expansion of the unitary heating element.

The present invention overcomes the problem of misalignment by providing for relative movement between the unitary heating element and the workholders. Either the unitary heating element or the workholders or both may be the movable element. In the particular embodiment disclosed for the manufacture of the tubular glass members having extending electrical leads, the workholders are shown to be movable. The unitary heating element is, therefore, maintained in a stationary position and the workholders are maintained in a first position where the tubular glass members are located below the unitary heating element. Electrical energy is then supplied to the unitary heating element and the unitary heating element expands in a predetermined fashion in relation to any expansion of the workholders. The expansion of the various elements has been measured beforehand and the location of the preformed openings in the unitary heating element is adjusted accordingly. After the expansion of the various elements has stabilized, the tubular glass members are now aligned with the preformed openings in the unitary heating element. The workholders are now raised so that the tubular glass members enter into the preformed openings in the unitary heating element so that heating energy produced by the unitary heating element is supplied to the tubular glass members to produce a sealing between the tubular glass member and the electrical leads.

In the particular embodiment of the invention described above, the tubular glass members are supported on a workholder referred to as a "pin plate." The pin plate has a plurality of upstanding pin members and the tubular glass members fit over and are supported by the pin members. The height of various portions of the pins is predetermined so that one surface portion of the pins may have a first height to predetermine the position of the electrical leads within the tubular glass members. A second surface portion of the pins may have a second predetermined height so as to predetermine the position of bead members which are placed intermediate the tubular glass members and the electrical leads. The pin plate including the pin members, therefore, provides multiple functions.

The particular embodiment of the invention described above has the unitary heating element and workholders within an atmospheric chamber so as to provide for a control of the atmospheric conditions during the sealing operation. The first workholder is supported on a platform and the height of the platform is controlled through a piston which extends through the bottom wall of the atmospheric chamber. The present invention also contemplates cooling the platform so as to draw heat away from the first workholder and the individual devices during the sealing operation so as to provent excess heat from building up in the individual devices.

A clearer understanding of the invention will be had with reference to the following description and drawings, wherein.

Figure 1:
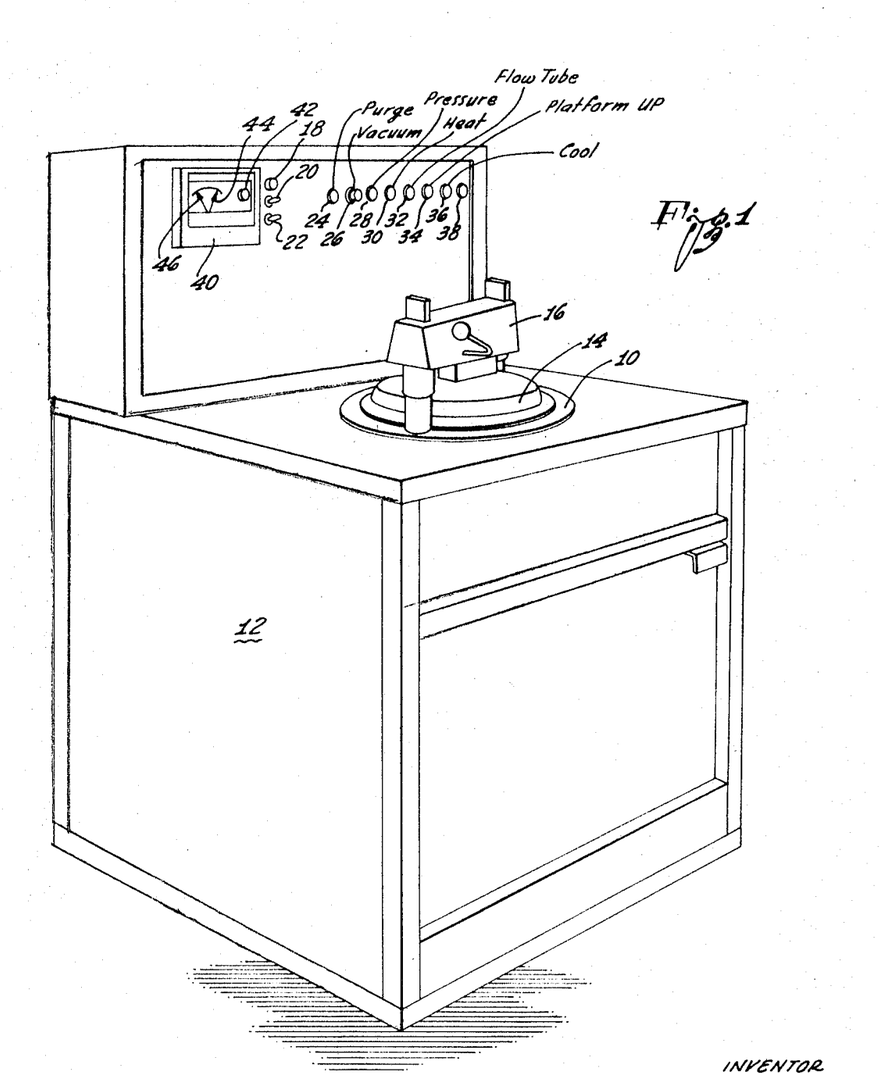
FIGURE 1 is a front perspective view of an apparatus constructed in accordance with the present invention, including an atmosphere chamber with its door in the closed position and illustrating the control panel.

In FIGURE 1, a chamber 10 is shown enclosed in a cabinet 12. A cover 14 is used to seal off the chamber 10. A mechanism 16 including a control arm produces a downward pressure on the cover 14 so as to seal the chamber. The chamber 10 has connected to it a gas supply and exhaust. A vacuum pump is also connected to the chamber and a heat sensing device such as a thermocouple is provided within the chamber so as to measure the temperature of the unitary heating element. The entire system for producing a sealing cycle for the individual devices will be explained later with preference to FIGURE 5.

In FIGURE 1 a control panel mounted on the cabinet 12 includes an overload fuse 18, an on-off switch 20 and a start switch 22. Also, a plurality of indicator lights are mounted on a control panel and are connected so as to light up in response to particular conditions within the chamber 10. For example, the indicator lights are numbered 24 through 38 and may indicate the following conditions within the atmospheric chamber during a particular sealing cycle. Indicator light 24 is on during a purge condition within the chamber 10. Indicator light 26 is on during a vacuum condition within the chamber 10. Indicator light 28 is on during a pressure condition within the chamber 10. Indicator light 30 is on during a heating condition within the chamber 10. Indicator light 32 is on during a flow tube condition within the chamber 10. Indicator light 34 is on during a sealing condition within the chamber 10. Indicator light 36 is on during a cooling condition within the chamber 10, and indicator light 38 is on when any one of the other indicator lights is on so as to provide a warning not to open the atmospheric chamber. A particular cycle to produce the above described conditions will be described later with reference to the embodiments of FIGURES 4 through 9.

In addition to the various switches and lights described above, the control panel also includes a temperature indicator and control unit 40 which is used to control the supply of electrical energy to produce the desired heating of the individual devices within the atmospheric chamber 10. For example, the temperature indicator and control unit 40 may be similar to a standard thermostat used in the home which maintains a particular desired temperature which has been previously set. For example, a control knob 42 adjusts the position of a setting indicator 44. The adjustment of the knob 42 sets the desired temperature to be maintained as shown by the position of the indicator 44. The temperature of a heating element contained within the chamber 10 is monitored and the monitored temperature is represented by the position of an indicator 46. When the indicator 46 reaches the desired temperature, which is represented by an overlay of the indicators 44 and 46, power to the heating element contained within the chamber 10 is switched off. The power is alternately switched on and off to maintain the desired temperature in a heating element contained within the chamber 10. It is to be appreciated that the power supplied to the heating element may be continuous and the level of the power may be varied by the indicator and control unit 40 so as to regulate the heating of the heating element.

Figure 2:
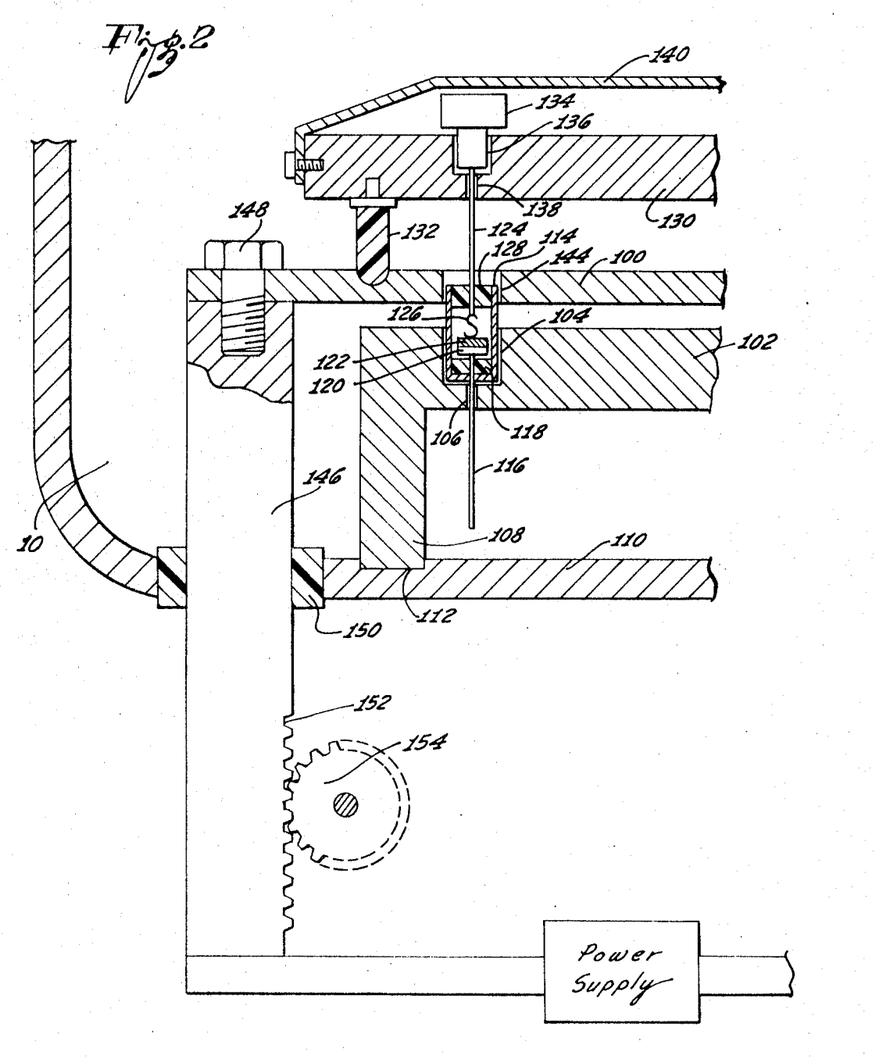
FIGURE 2 is a cross-sectional view of a portion of the atmospheric chamber showing a stationary workholder supporting a diode and a unitary heating element movable relative to the workholder.

A particular embodiment of an apparatus for producing a sealing operation on a plurality of individual devices is shown in FIGURE 2. In the embodiment of FIGURE 2, a heating element 100 is separate and distinct from a workholder 102. The heating element 100 may be composed of a material such as graphite. The workholder 102 has a first portion 104 of an opening which does not completely extend through the workholder 102. A second portion 106 of the opening extends from the bottom wall of the first portion 104 and through the workholder 102. A leg member 108 supports the workholder 102 above a floor portion 110 of the atmospheric chamber 10.

A slot 112 is cut into the floor 110 in order to receive and accurately position the leg 108. The slot 112 insures the accurate positioning of the workholder 102 within the atmospheric chamber 10. A plurality of individual diodes represented by a single diode in the embodiment shown in FIGURE 2 is supported by the workholder 102. The diodes each include a tubular member 114 and the tubular member may be composed of a material such as glass. A lead member 116 is sealed to the bottom of the tubular member 114 through a sealing bead 118. The top surface of the lead member 116 flares out into a stud 120 and the stud 120 supports a piece of semiconductor material 122. A second lead 124 terminates in an S-shaped piece of resilient material 126 which is used to make contact with the semiconductor material 122. A bead of insulating material 128 surrounds the lead 124 and the sealing is accomplished in the diode by sealing between the tubular member 114 and the bead 128.

A weight plate 130 is supported on the heating element 100 and above the diode by a pair of insulating pins 132, one of which is shown in FIGURE 2. The weight plate is used to provide downward pressure on the lead 124 in order to insure a positive contact between the resilient member 126 and the semiconductor material 122. The weight plate includes a plurality of weight members 134 which extend into a first opening 136 in the weight plate 130. A second opening 138 in the weight plate 130 is sufficiently large to pass the lead 124 but not sufficiently large to pass the weight plate 134. A top member 140 maintains the weights 134 in position. As can be seen, the weight 134 exerts pressure on the lead 124 which is transmitted to the resilient portion 126.

Intermediate the weight plate 130 and the workholder 102 is the heating element 100. The heating element 100 is in the form of a unitary plate which contains a plurality of openings, which are represented by the single opening 144. Each opening 144 is designed to surround the upper portion of a diode and, although FIGURE 2 illustrates a single opening for sealing a single diode, it is to be appreciated that many such openings are used so as to provide the heating operation on a plurality of individual diodes all at the same time. The heating element 100 is relatively simple since the openings 144 are merely a plurality of single-diameter holes through the heating element 100. The heating element 100 is supported on a post 146 which also serves as a bus bar and the heating element 100 is connected to the bus bar 146 through a bolt member 148. The bus bar extends through the bottom wall 110 of the chamber 10 and is supported and sealed by an insulating member 150. Electrical energy is supplied to the bus bar 146 by a power supply.

The bus bar 146 may be raised or lowered using a rack 152 and pinion 154. The use of the rack and pinion facilitates the placement of the workholder 102 within the atmospheric chamber. The heating element 100 is first raised to its highest position and the workholder 102 is positioned within the chamber through the use of the slot 112. After the workholder 102 is properly positioned, the rack and pinion is again operated to lower the heating element 100 until the heating element is in the position shown in FIGURE 2.

It is also to be appreciated that the rack and pinion may be operated during the sealing portion of the cycle so that the diodes pass through the heating element 100 as electrical current flows through the heating element. In this way it is possible to preheat the heating element 100 and then pass the diodes through the preheated heating element to insure that the semiconductor material 122 is subjected to the heat waves and infrared energy produced by the heating element for the shortest possible period of time. When the heating element 100 is preheated, any expansion of the heating element relative to the workholder 102 may be predetermined so that the spacing of the openings 144 in the heating element 100 are designed to be aligned with the diodes after the expansion has taken place but before the diodes are inserted into the openings 144. In this way, the expansion of the heating element is compensated for so that contact between the diodes and the heating element, which could produce breakage of the diodes, is eliminated.

In the embodiment of FIGURE 2, heat waves and infrared energy are produced from the heating element 100 when electrical current passes through the heating element. The heat waves and infrared energy produced by the heating element 100 are then transferred to the outer surface of the diode and in particular are transferred to the tubular member 114 and the bead 128. When the temperature is high enough, the tubular member 114 and the bead 128 melt and fuse together to produce a sealed diode structure. It can be seen from the above description of the invention that the diode sealer of the present invention can seal a great number of diodes at the same time, since the single diode shown in FIGURE 2 is merely representative. In addition, the diodes may be subjected to various atmospheric conditions before, during and after the sealing operation in order to insure the proper sealing of the diodes. The apparatus of the present invention can therefore accurately produce larger quantities of high quality diodes than prior art devices.

Figure 3:
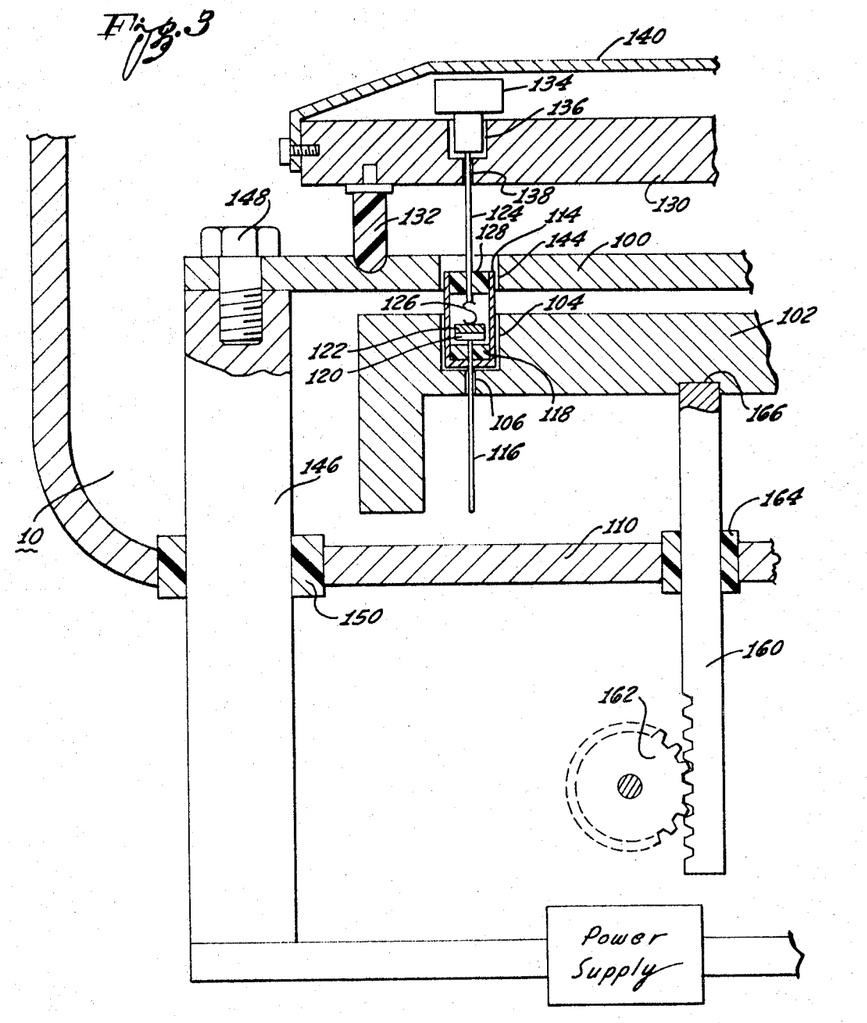
FIGURE 3 is an alternative embodiment to FIGURE 2 showing a stationary unitary heating element and a movable workholder supporting a diode.

It is also to be appreciated that the heating element 100 may remain stationary and means may be provided to raise and lower the workholder 102. This type of arrangement is shown in the embodiment of FIGURE 3 which is an alternative to that of FIGURE 2 and similar elements are given similar reference characters. In FIGURE 3 a heating element 100 and a workholder 102 are positioned adjacent to each other. The workholder 102 has a plurality of dual openings 104 and 106 so as to receive and support a diode structure including an outer tubular member 114, a lead member 116, a bead portion 118, a flared portion 120 of the lead member 116, and semiconductor material 122.

A second lead member having a resilient portion 126 extends into the tubular member 114 and a bead member 128 is sealed to the lead member 124. A weight plate 130 including a weight 134 provides pressure on the lead member 124. The weight plate 130 is supported on the heating element 100 by a pair of insulating members 132, one of which is shown in FIGURE 3. Electrical energy is supplied by a power supply to a bus bar 146. The bus bar extends through the bottom wall 110 of the atmospheric chamber 10 and the bus bar 146 is insulated from the bottom wall 110 by an insulating member 150. The heating element 100 is connected to the bus bar 146 by the bolt member 148.

The workholder 102 is supported for movement by a rack member 160. The rack member 160 is associated with a pinion 162 so as to provide vertical movement of the rack member 160. The rack member extends through the bottom wall 110 of the atmospheric chamber 10 and is insulated from the bottom wall 110 by an insulating member 164. The rack member supports the workholder 102 and is keyed into a groove portion 166 in the workholder 102.

As can be seen in FIGURE 3, the workholder 102 and the associated diode members supported by the workholder 102 may be raised or lowered in accordance with the operation of the rack and pinion 160 and 162. The use of the rack and pinion facilitate the placement of the workholder within the atmospheric chamber 10. Also, the rack and pinion 160 and 162 may be operated during the sealing portion of the cycle so that the diodes pass through the heating element 100 as electrical current flows through the heating element. In this way, it is possible to preheat the heating element 100 and then pass the diodes through the preheated heating element to insure an accurate alignment of the diodes with the openings 144 in the heating element 100.

Figure 4:
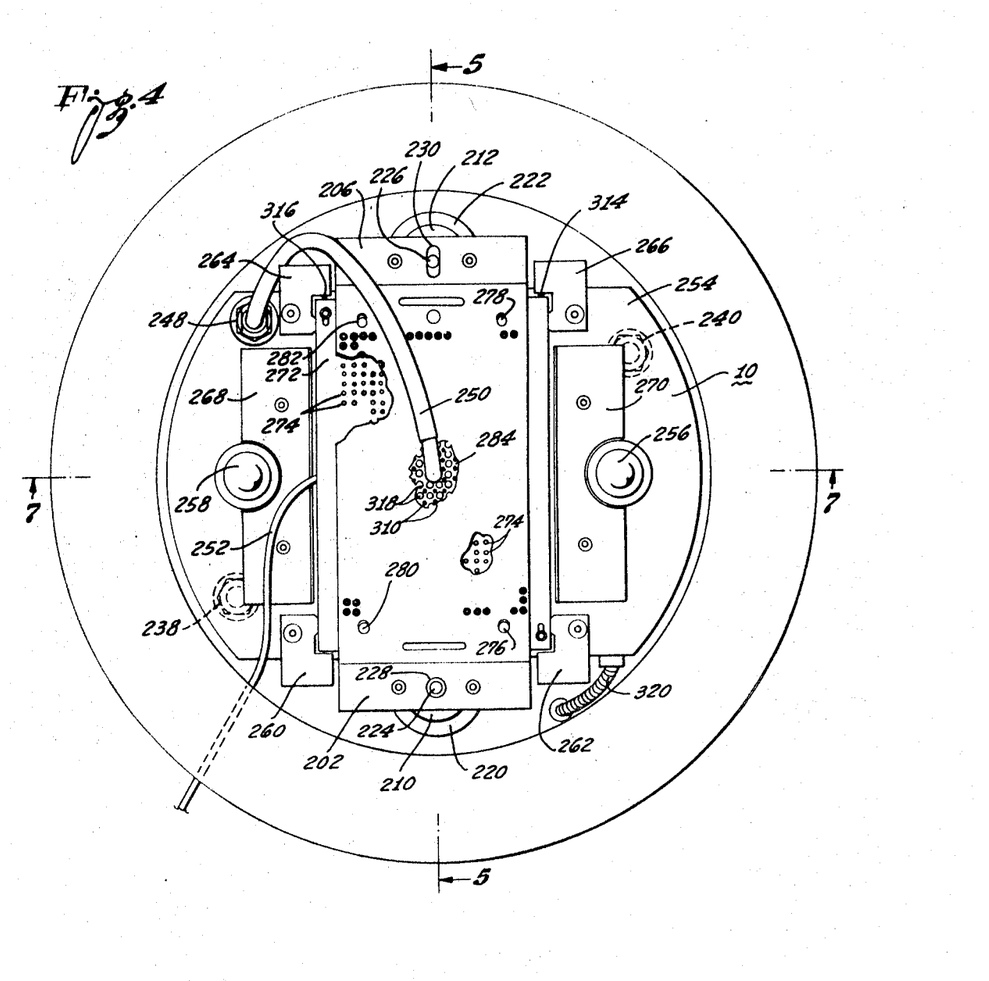
FIGURE 4 is a top view of a second embodiment of the invention showing an apparatus for producing a diode component including a tubular portion and a lead portion.
Figure 5:
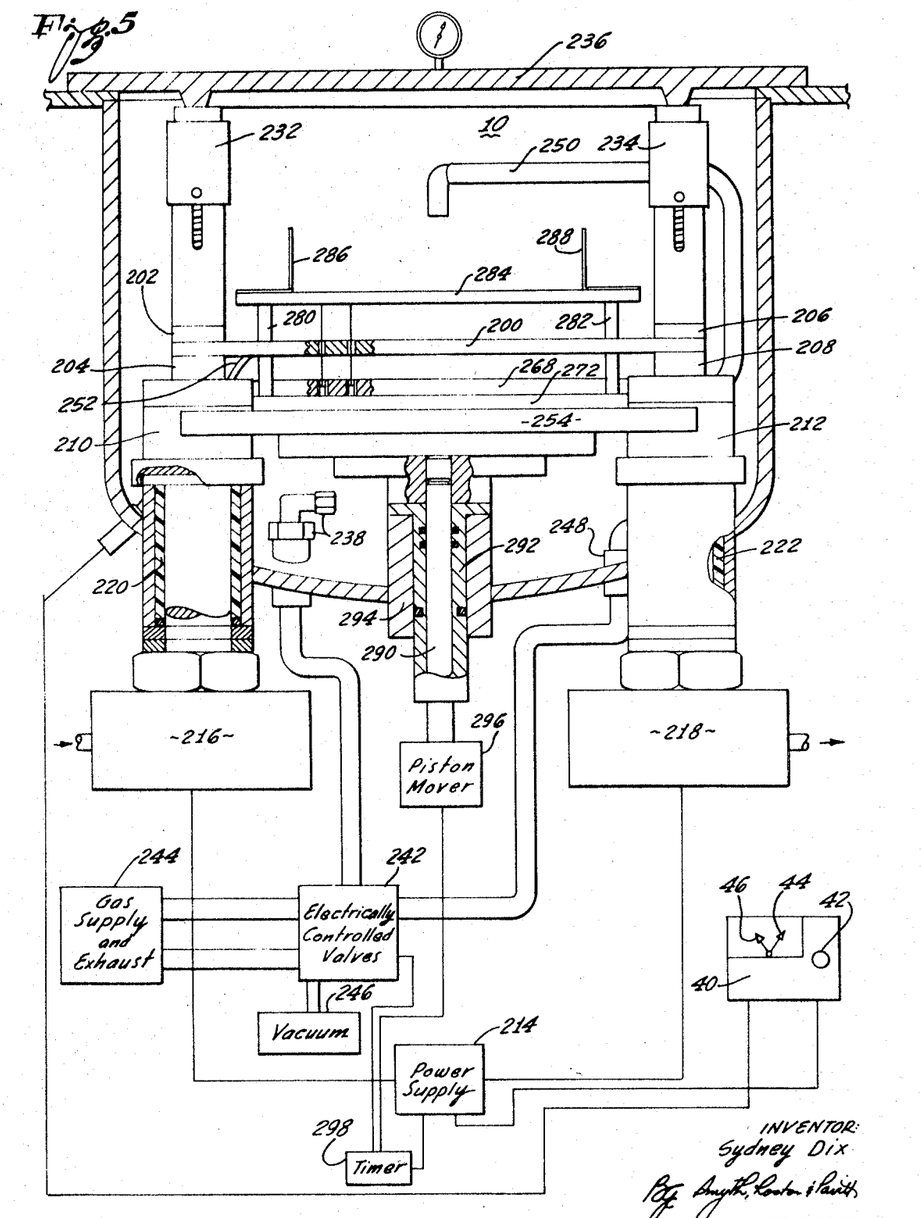
FIGURE 5 is a cross-sectional view of the embodiment of FIGURE 4 taken along the line 5—5 of FIGURE 4.
Figure 6:
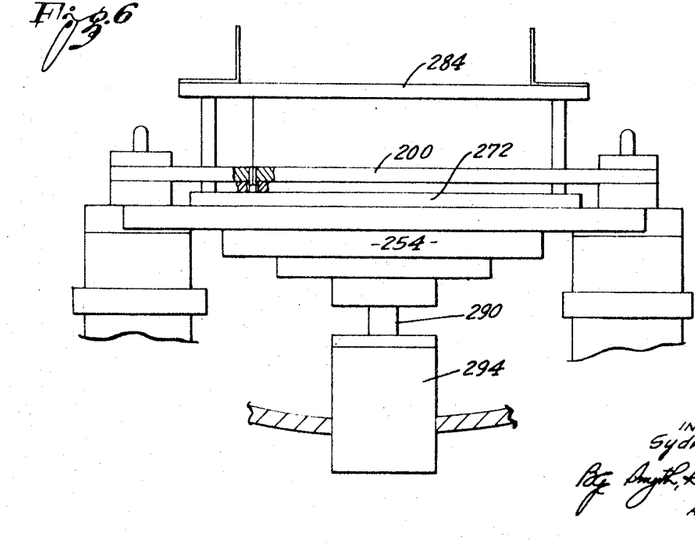
FIGURE 6 is a cross-sectional view similar to and including a portion of FIGURE 5 but showing the position of the unitary heating element and the workholder structure so as to provide for the heating of the individual devices supported by the workholder structure.
Figure 7:
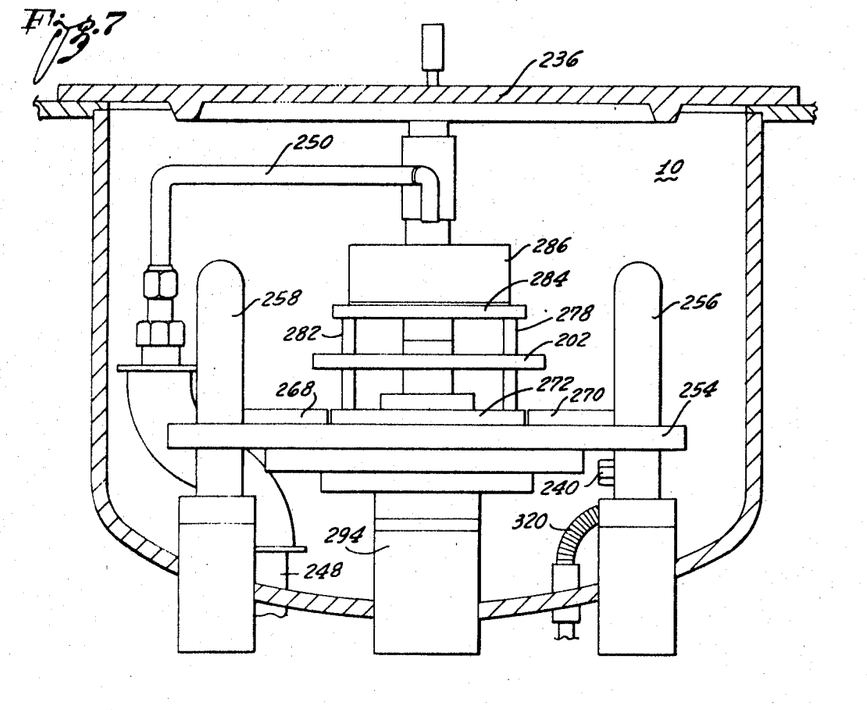
FIGURE 7 is a cross-sectional view of the embodiment of FIGURE 4 taken along the line 7—7 of FIGURE 4.
Figure 8:
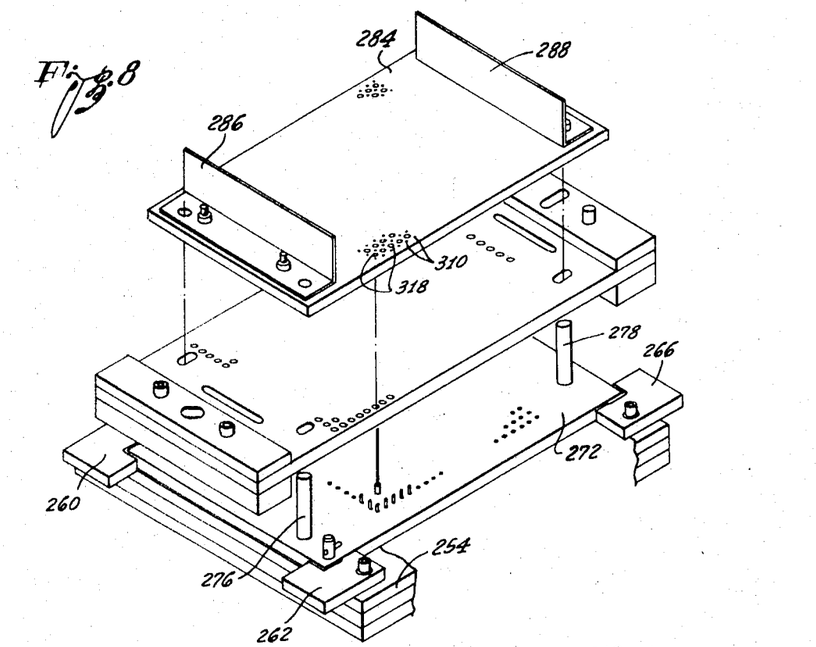
FIGURE 8 is an exploded perspective view of the workholder structure and unitary heating element of the embodiment of FIGURES 4 through 7.

FIGURES 4 through 9 illustrate another embodiment of the sealing device of the present invention. In FIGURE 4 a top view of the atmospheric chamber 10 is shown. FIGURE 5 is a cross-sectional view taken along line 5—5 of FIGURE 4, and FIGURE 7 is a cross-sectional view taken along line 7—7 of FIGURE 4. In FIGURE 5 a heating element 200 is disposed within the chamber 10. The heating element 200 may be constructed of a material such a graphite. The heating element includes bus bars 202 and 204 at one end of the heating element 200 and bus bars 206 and 208 at the other end of the heating element. The bus bars help to distribute the electrical energy uniformly through the heating element 200.

The heating element 200 is connected to a pair of electrical conductors 210 and 212. The conductors 210 and 212 receive electrical energy from a power supply 214. Since the conductors 210 and 212 may receive a large quantity of electrical current the conductors may be water cooled, as shown by water cooling members 216 and 218. The conductors 210 and 212 pass through the wall of the chamber 10 and may be insulated from the chamber 10 by insulating members 220 and 222.

The conductors 210 and 212 are stationary and the heating element 200 may be connected to the conductors 210 and 212 through the use of pin members 224 and 226, best shown in FIGURE 4. As can be seen in FIGURE 4, the pin portions pass through openings 228 and 230 in the heating element 200. Opening 228 is slightly larger than the diameter of the pin 224 so that the pin 224 holds the one end of the heating element 200 containing the opening 228 in a stationary position. The opening 230, however, is elongated and receives the pin 226 and any expansion of the unitary heating element 200 is allowed by the elongated opening 230.

The heating element 200 and the conductors 210 and 212 are maintained in good electrical contact using spring contact members 232 and 234. The spring contact members include a conductive end portion which has an opening to receive the rod elements 224 and 226 and an insulating end portion in contact with a cover 236.

The spring contact members 232 and 234 are designed to extend past the top of the chamber 10 when the chamber is open. The chamber 10 is sealed by positioning the cover 236 over the chamber opening and by pressing the cover 236 down so as to create a seal. As the cover 236 is sealed, the spring contact members 232 and 234 are also compressed through the pressure of the cover 236 on the top of the spring contact members. The pressure on the spring contact members creates a good contact between the electrical conductors 210 and 212 and the heating element 200. It is to be appreciated, as indicated above, that the top portion of the spring contact members 232 and 234 are constructed of insulating material so as to eliminate any electrical contact between the chamber and the conductors 210 and 212.

Looking at FIGURES 4, 5 and 7, it can be seen that a plurality of ports extend into the chamber 10. For example, a pair of oppositely disposed ports 238 and 240 are connected to an electrically controlled valve structure 242. A gas supply and exhaust 244 is also connected to the valve structure 242. In addition, a vacuum pump 246 is connected to the electrically controlled valve structure 242. A flow tube port 248 extends into the chamber 10 and includes an elongated flow tube 250 which is disposed over the unitary heating element 200.

It is also to be appreciated that other equipment may be coupled through the walls of the atmospheric chamber 10. For example, a thermocouple wire 252 may extend into the chamber 10 and be connected to the heating element 200 so as to monitor the temperature of the heating element 200. The thermocouple wire 252 may also be connected to the temperature indicator and control unit 40 shown in FIGURE 1. The power supply 214 may also be connected to the temperature indicator and control unit 40 so that the temperature indicator and control unit 40 controls the output from the power supply so as to regulate the flow of current into the unitary heating element 200.

The atmospheric chamber 10 also includes a platform structure 254 which is supported on a pair of guide members 256 and 258. The platform 254 includes a plurality of positioning devices 260, 262, 264, 266, 268 and 270 so as to form a recessed area to receive a workholder. In particular, the positioning devices create a recess to receive the workholder 272. The workholder 272 may be seen more clearly in FIGURE 8 and is a flat plate including a plurality of small pins 274. The workholder 272 also includes four large posts 276, 278, 280 and 282, the last two of which may be seen with reference to FIGURE 4. The small pins 274 support tubular glass members as will be explained later.

The posts 276 through 282 extend through openings in the heating device 200 and are received by openings in a second workholder 284. The second workholder 284 is used to support a plurality of electrical lead members. The second workholder 284 includes stop members 286 and 288. The stop members 286 and 288 are slidable so as to allow the posts 276 through 282 to extend through openings in the stop members 286 and 288 for a first open position of the stop members and to be stopped by the stop members for a second closed position of the stop members when the openings in the second workholder are closed. The closed position of the stop members 286 and 288 is shown in FIGURES 5 and 7. The first workholder 272 which serves as a pin plate and the second workholder 284 which serves as a lead plate are, therefore, interconnected by the posts 276 through 282 and the combination of the two workholders may be moved independent of the heating element 200 since the posts extend through openings in the heating element 200.

The movement of the workholders is controlled by a piston 290. The piston 290 moves through a bearing structure 292 which is sealed to a support member 294. The support member 294 extends through the bottom wall of the chamber 10. The piston structure may be best seen in FIGURE 5. The piston 290 is controlled by a piston mover 296. The particular sequence of operation of the power supply 214, the electrically controlled valves 242 and the piston mover 296 are all controlled by a timer 298. The timer 298, therefore, controls the piston mover to produce movement of the piston 290 at the appropriate time so that the platform 254 may be moved upward to provide movement of the workholders 272 and 284. In addition, the timer 298 controls the power supply 214 so as to control the flow of current at a particular time to the heating element 200. The temperature indicator and control unit 40 regulates this current flowing through the heating element 200. The timer 298 also controls the gas supply, exhaust and vacuum created in the chamber 10 through the ports 238, 240 and 248 through the use of the electrically controlled valves.

When the piston mover 296 controls the piston 290 to move the platform upward, the relationship of the heating element 200 and the workholders 272 and 284 are shown in FIGURE 6. In the position shown in FIGURE 6, the heating element 200 is positioned adjacent to the workholder 272 and in this position the heating element 200 may be used to produce heating of the individual devices so as to produce a sealing operation.

Figure 9:
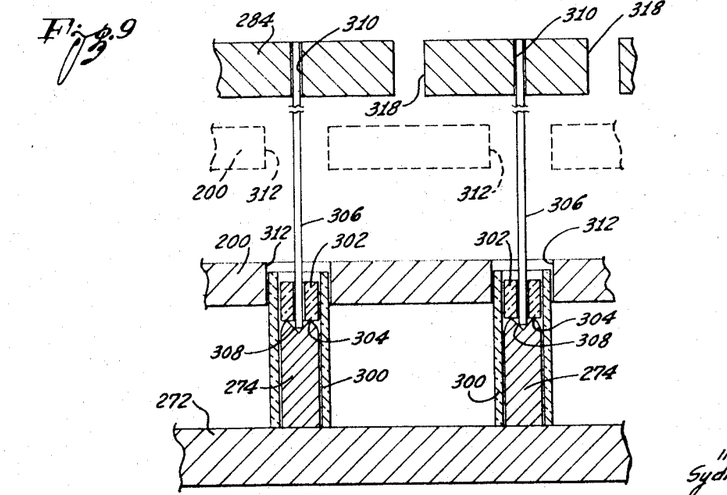
FIGURE 9 is an enlarged fragmentary view of the relationship of the various diode components supported by the structure of FIGURE 8.

FIGURE 9 illustrates the structure of the heating element and the workholders for producing a sealing operation on a particular diode component. In FIGURE 9, the workholder 272 includes the plurality of upwardly extending pin members 274. A plurality of tubular glass members 300 are positioned over the pins 274 and the height of the tubular glass members 300 extends higher than the highest point of the pins 274. Bead members 302 fit within the tubular glass members 300 and the position of the bead members 302 within the tubular glass members 300 is controlled by the height of a first portion 304 of the pin members 274.

Electrical lead members 306 extend into the tubular glass members 300 and pass between the bead members 302 and the extension of the lead members 306 into the tubular glass members 300 is controlled by the height of a second portion 308 of the pin members 274. It is to be appreciated that, although in FIGURE 9 the extension of the lead members 306 is controlled by a cone-shaped cutout in the pin members 274, other cutout configurations may be used so as to produce the proper extension of the lead members 306 into the tubular glass members 300. Typically, as shown in FIGURE 9, the lead members 306 extend past the bead members 302. The electrical lead members 306 also extend upward and are supported by a plurality of openings 310 in the lead plate 284.

Prior to the sealing operation, the position of the heating element 200 relative to the workholder 272 is shown by the dotted lines. As can be seen by the dotted lines, the heating element 200 is free of any engagement with the tubular glass member 300. The unitary heating element 200 contains a plurality of openings 312 which are arranged in the same predetermined spatial pattern as the pins 274 and the diode components. When the workholders 272 and 284 are moved upward in accordance with the movement of the piston 290 shown in FIGURE 5, the position of the unitary heating element 200 relative to the workholder 272 is shown by the solid lines of the heating element 200 in FIGURE 9. It can be seen in FIGURE 9 that when the workholders 272 and 284 are moved, the unitary heating element 200 has its openings 312 surrounding the upper portion of the tubular glass members 300.

When electrical energy is supplied to the heating element 200, heat waves and infrared energy is produced at the openings 312 and enter into the tubular glass members 300 and bead members 302. Melting of the tubular glass members 300 and bead members 302 occurs so as to seal the lead members 306 at one end of the tubular glass members 300. It has been determined that problems of alignment occur when the unitary heating element 200 is not preheated prior to the movement of the workholders 272 and 284. The problems of alignment occur because the unitary heating element expands relative to the workholders as the heating element is heated and this expansion is allowed for by the elongated opening 230 shown in FIGURE 4. Since the expansion can be predetermined, the openings 312 are patterned in such a way that the alignment between the openings 312 and the tubular glass members 300 is proper after the relative expansion between the unitary heating element and the workholders. The expansion of the workholder 272 is provided for by members 314 and 316 shown in FIGURE 4, whch are spring loaded. The expansion relationhsip between the workholders and the heating element is, therefore, predetermined to provide for the proper alignment so as to eliminate any breakage or improper sealing of the diode components produced by the embodiment of the invention shown in FIGURES 4 through 9.

The lead plate 284 also includes a plurality of additional openings 318 which allow for the passage of gas from the flow tube 250 to pass through the lead plate and flow over the heating element 200. The gas from the flow tube 250 provides for a more uniform distribution of the heating energy from the unitary heating element to the components to be sealed.

A particular cycle of operation of the sealing apparatus shown in FIGURES 4 through 9 may be as follows. After all of the various components are loaded into the chamber 10, the chamber 10 is sealed by closing the cover member 236. The atmosphere within the chamber 10 may be purged with an inert gas for a period of time such as thirty seconds to one minute. The purge consists of running the inert gas, such as dry nitrogen, through the chamber 10 to remove the atmosphere present in the chamber 10 when the cover 236 was closed. The purge portion of the cycle is accomplished by using the gas supply and exhaust 244. The purge is controlled by the timer which in turn controls the electrically controlled valves 246 to connect the gas supply and exhaust 244 to the ports 238 and 240. As the chamber is being purged, the light 24 shown in FIGURE 1 is on. In addition, the light 38 is also on, since the sealing cycle has now begun.

A second step in the cycle might be to pull a vacuum in the chamber 10 to evacuate the purge gas and any remaining contaminants. The vacuum in the chamber 10 is produced by the vacuum pump 246 so as to connect the vacuum pump 246 to one of the ports 238 and 240. During the vacuum portion of the cycle, the light 26 is on, as is the light 38.

A third step of the sealing cycle is to pressurize the chamber 10 with an inert gas, for example, a gas such as dry nitrogen. The pressurizing is accomplished by connecting the gas supply 244 to one of the ports 238 and 240 through the control of the electrically controlled valves 242 by the timer 298. When the chamber is being pressurized, the light 28 is on, as is the light 38. The pressurization may also be accomplished using a gas such as a forming gas. The forming gas may be a gas which contains hydrogen. Forming gas may be used when a brazing operation is to be performed since the forming gas breaks any surface tension.

A fourth step in the sealing cycle might be a constant purge under pressure so as to remove any out-gassing from the various components during later heating operations. This purge may continue during the heating and sealing portions of the cycle. When the purge cycle is on, the light 24 is again lit.

A fifth step in the cycle is to heat the heating element 200 by supplying electrical energy to the heating element 200 from the power supply 214. The supply of the electrical energy is controlled by the timer 298. The temperature indicator and control unit 40 regulates the current to the heating element 200.

As the heating element 200 is raised in temperature, a sixth step may be performed by allowing gas from the flow tube 250 to flow so as to produce a flow of gas on the heating element 200 through the holes 318 in the lead plate 284. The flow of gas from the flow tube 250 produces a more uniform distribution of heat in the heating element 200. As electrical energy is supplied to the heating element 200, the light 30 is on, in addition to the light 38. When gas flows from the flow tube 250, the light 32 is on, and if heating, purging and flow tube are all produced at the same time, the lights 24, 30 and 32, in addition to the light 38, are all on. The gas from the flow tube is controlled by connecting the gas supply 244 to the port 248 via the electrically controlled valves. The electrically controlled valves are in turn controlled by the timer 298.

After the heating element 200 reaches the proper temperature, the platform 254 may be moved to the upward position so that the heating element 200 is positioned adjacent to the workholder 272 as shown in FIGURES 6 and 9. Since the heating element 200 has already been preheated, any expansion of the heating element 200 has taken place and the expansion has been predetermined so that the openings 312 as shown in FIGURE 9 now accurately surround the components to be heated. When the platform 254 is moved to the up position, the light 34 comes on. The platform 254 is maintained in the up position for a particular period of time which has been predetermined so as to allow for the proper heat energy to enter into the components so as to produce a sealing operation. The sealing portion of the cycle may take, for example, sixty seconds and the temperature of the heating element 200 may be a temperature such as 1000° C.

After the proper time has elapsed for the sealing to occur, the platform 254 is brought down. The heating element may still be supplied with electrical energy so as to produce an annealing of the seal which has just been produced. For example, the annealing may be for a period of fifteen seconds. After the platform has been brought down and the annealing has taken place, the electrical energy may now be disconnected from the heating element 200 and the electrical components which have been sealed are now allowed to cool down. In addition, a cast cooling may be produced by supplying gas to the atmospheric chamber so as to continuously carry heat energy out of the chamber. When the cooling portion of the cycle occurs, the light 36 is on, in addition to the light 38.

It is to be appreciated that the invention has been described with reference to a particular embodiment. For example, the embodiment of FIGURES 4 to 9 is used for producing a particular component useful in the further manufacture of diodes. However, the specific configuration of the component may be varied in accordance with the desired characteristics of the diode and other modifications to the sealing apparatus of the present invention may be made. For example, during the heating and sealing of the components, the platform 254 may be cooled by supplying cool air or liquid to the platform. For example, a flexible tubing such as tubing 320 may be connected to the platform and the platform 254 may be hollow so as to receive and distribute the coolant.

It is to be appreciated that other modifications and adaptations may be made and the invention is only to be limited by the appended claims.

What is claimed is:

1. Means for heating a plurality of individual devices at the same time and where the plurality of individual devices have first and second ends and are held at the first end by a workholder in a predetermined spatial pattern, including:
   a heating element adjacent the workholder having preformed areas arranged in the predetermined spatial pattern to have each performed area adjacent to the second end of an individual device and wherein the workholder is movable relative to the heating element,
   a source of electrical current,
   means operatively coupled to the heating element and the source of electrical current to supply electrical current to the heating element for producing heating energy from the heating element at each preformed area to produce heat at the second end of each individual device, and
   timing means operatively coupled to the last mentioned means to control the last mentioned means to supply electrical current to the heating element prior to the movement of the workholder relative to the heating element.

2. Apparatus for heating a plurality of individual devices, including:
   a workholder for supporting the individual devices in a predetermined spatial pattern,
   a unitary heating element having preformed heating areas arranged in the predetermined spatial pattern,
   means for heating the unitary heating element by supplying electrical energy to the unitary heating element to provide heating energy from the preformed heating areas,
   means for providing a relative movement between the workholder and the heating element to position the workholder adjacent to the heating element to produce heating of the individual devices from the heating areas of the unitary heating element, and
   timing means coupled to the means for heating for controlling the means for heating to supply electrical energy to the unitary heating element prior to the relative movement between the workholder and the heating element.

3. The apparatus of claim 2 additionally including means for producing a flow of gas on the heating element to provide a uniform production of heating energy from the preformed areas arranged in the predetermined spatial pattern.

4. The apparatus of claim 2 wherein the workholder and unitary heating element are contained within a sealed pressure chamber.

5. A heating apparatus for producing a heating operation on a plurality of individual devices at the same time, including:
   a workholder for supporting the plurality of individual devices in a predetermined spatial pattern,
   a unitary heating element having preformed areas arranged in the predetermined spatial pattern,
   a source of electrical energy,
   means for coupling the source of electrical energy to the heating element for producing heating energy from the heating element at the preformed areas,
   means for positioning the workholder adjacent to the heating element and with the individual devices adjacent the preformed areas to have the heating energy from the preformed areas heat the individual devices, and
   means for producing a flow of gas on the heating element to provide a uniform production of heating energy from the preformed areas arranged in the spatial pattern.

6. The heating apparatus of claim 5 additionally including means for producing a flow of gas and wherein a portion of the workholder includes a plurality of openings to allow the passage of the gas to the heating element.

7. The heating apparatus of claim 5 wherein the workholder and unitary heating element are contained within a sealed pressure chamber.

8. Apparatus for heating a plurality of individual devices wherein each device has a particular peripheral configuration, including:
   a workholder for supporting the individual devices in a predetermined spatial pattern,
   a unitary heating element having preformed openings arranged in the predetermined spatial pattern and with each opening having the particular peripheral configuration of the individual devices,
   means for heating the unitary heating element by supplying electrical energy to the unitary heating element to provide heating energy from the preformed heating areas and with the heating of the unitary heating element producing a relative expansion of the unitary heating element and the workholder and with the individual devices aligned with the preformed openings after the heating,
   means for providing a relative movement between the workholder and the heating element to position the workholder adjacent to the heating element and with the preformed openings surrounding the individual devices to produce heating of the individual devices from the preformed openings of the unitary heating element, and timing means coupled to the means for heating for controlling the means for heating to supply electrical energy to the unitary heating element prior to the relative movement between the workholder and the heating element.

9. The apparatus of claim 8 wherein one end of the unitary heating element is mounted in a fixed position and the other end is mounted in a sliding position.

10. The apparatus of claim 8 wherein the one ends of both the unitary heating element and the workholder are mounted in a fixed position and the other ends of both the unitary heating element and the workholder are mounted in a sliding position so that the unitary heating element and the workholder may expand independently of each other.

11. A heating apparatus for sealing a plurality of individual wires within the ends of a plurality of individual glass tubes at the same time, including:
   a workholder for supporting the plurality of glass tubes and wires and with each wire partially extending into one end of the glass tubes and with the glass tubes and wires maintained in a predetermined spatial pattern,
   a unitary heating element having preformed openings arranged in the predetermined spatial patterns,
   a source of electrical energy,
   means for coupling the source of electrical energy to the heating element for producing heating energy from the heating element at the preformed openings, and
   means for producing a relative movement between the workholder and the heating element to position the workholder adjacent to the heating element and with the preformed openings surrounding the glass tubes and wires at the one ends of the glass tubes to have the heating energy from the preformed openings heat the glass tubes to seal the wires within the one ends of the glass tubes, and
   wherein the workholder includes a plate having a plurality of upstanding pins arranged in the predetermined spatial pattern and with each glass tube surrounding one of the upstanding pins and with the height of at least a portion of each upstanding pin limiting the extension of each of the wires within the glass tubes.

12. A heating apparatus for sealing a plurality of individual wires within a plurality of individual glass tubes at the same time, including:
   a first workholder for supporting the plurality of individual glass tubes in a predetermined spatial pattern,
   a second workholder spaced from the first workholder for supporting the plurality of individual wires in the predetermined spatial pattern and with the first and second workholders maintaining a portion of each of the individual wires to extend within one end of each of the glass tubes,
   a unitary heating element intermediate the first and second workholders having preformed openings arranged in the predetermined spatial pattern to surround the individual wires,
   a source of electrical energy,
   means for coupling the source of electrical energy to the heating element for producing heating energy from the heating element at the preformed openings, and
   means for producing a relative movement between the workholders and the heating element to position the first workholder adjacent to the heating element to have the preformed openings surround the glass tubes at the one end to direct the heating energy from the preformed openings to the glass tubes to seal the individual wires within the one ends of the glass tubes.

13. The heating apparatus of claim 12 wherein the second workholder is spaced from the first workholder by spacing members which extend through openings in the unitary heating element and wherein the spacing members additionally act to index the first and second workholders and the unitary heating element.

14. The heating apparatus of claim 12 wherein the first workholder includes a plate having a plurality of upstanding pins arranged in the predetermined spatial pattern and with each glass tube surrounding one of the upstanding pins and with the height of at least a portion of each upstanding pin limiting the extension of each of the wires within the glass tubes.

15. The heating apparatus of claim 12 additionally including a plurality of hollow beads surrounding the wires and within the glass tubes for use in sealing the wires to the glass tubes and wherein the first workholder includes a plate having a plurality of upstanding pins arranged in the predetermined spatial pattern and with each glass tube surrounding one of the upstanding pins and with the height of a first portion of each of the upstanding pins limiting the extension of each of the wires within the glass tubes and the height of a second portion of each of the upstanding pins limiting the extension of each of the beads within the glass tubes.

16. The heating apparatus of claim 12 additionally including means for providing a flow of gas and wherein the second workholder includes a plurality of openings to allow the passage of the gas to the unitary heating element.

17. Apparatus for heating a plurality of individual devices, including:
   a movable platform,
   a workholder mounted on the platform for supporting the individual devices in a predetermined spatial pattern,
   a stationary unitary heating element having preformed heating areas arranged in the predetermined spatial pattern,
   means for preheating the unitary heating element by supplying electrical energy to the unitary heating element to provide heating energy from the preformed heating areas, and
   means for providing a movement of the platform after the heating element has been preheated to position the workholder adjacent to the heating element to produce heating of the individual devices from the heating areas of the unitary heating element, and
   a pair of guide rods for positioning the movable platform.

18. A heating apparatus for sealing a plurality of individual wires within the ends of a plurality of individual glass tubes at the same time, including:
   a workholder for supporting the plurality of glass tubes and wires and with each wire partially extending into one end of one of the glass tubes and with the glass tubes and wires maintained in a predetermined spatial pattern,
   a unitary heating element having preformed openings arranged in the predetermined spatial pattern,
   a source of electrical energy,
   means for coupling the source of electrical energy to the heating element for producing heating energy from the heating element at the preformed openings, and
   means for producing a relative movement between the workholder and the heating element to position the workholder adjacent to the heating element and with the preformed openings surrounding the glass tubes and wires at the one ends of the glass tubes to have the heating energy from the preformed openings heat the glass tubes to seal the wires within the one ends of the glass tubes, and wherein the heating apparatus includes a plurality of hollow beads surrounding the wires and within the glass tubes for use in sealing the wires to the glass tubes and wherein the workholder includes a plate having a plurality of upstanding pins arranged in the predetermined spatial pattern and with each glass tube surrounding one of the upstanding pins and with the height of a first portion of each of the upstanding pins limiting the extension of each of the wires within the glass tubes and the height of a second portion of each of the upstanding pins limiting the extension of each of the beads within the glass tubes.

19. Apparatus for heating a plurality of individual devices, including:
   a movable platform,
   a workholder mounted on the platform for supporting the individual devices in a predetermined spatial pattern,
   a stationary unitary heating element having preformed heating areas arranged in the predetermined spatial pattern,
   means for preheating the unitary heating element by supplying electrical energy to the unitary heating element to provide heating energy from the preformed heating areas,
   means for providing a movement of the platform after the heating element has been preheated ot position the workholder adjacent to the heating element to produce heating of the individual devices from the heating areas of the unitary heating element, and
   means for cooling the movable platform.

References Cited
UNITED STATES PATENTS

| | | |
|---|---|---|
| 1,691,562 | 11/1928 | Bissell _________ 219—157 X |
| 2,705,768 | 4/1955 | Kleimack et al. ____ 219—85 X |
| 2,736,847 | 2/1956 | Barnes. |
| 3,220,380 | 11/1965 | Schaarschmidt. |
| 3,271,208 | 9/1966 | Allegretti. |

JOSEPH V. TRUHE, Primary Examiner

B. A. STEIN, Assistant Examiner

U.S. Cl. X.R.

29—498; 219—50; 228—4